United States Patent [19]

Harakon et al.

[11] Patent Number: 4,913,207
[45] Date of Patent: Apr. 3, 1990

[54] PNEUMATIC RADIAL TIRES

[75] Inventors: Katsuyuki Harakon, Higashiyamato; Ken Kijima, Kodaira, both of Japan

[73] Assignee: Bridgestone Corporation, Tokyo, Japan

[21] Appl. No.: 161,895

[22] Filed: Feb. 29, 1988

[30] Foreign Application Priority Data

Mar. 5, 1987 [JP] Japan ............................ 62-48911

[51] Int. Cl.$^4$ ............................................ B60C 11/08
[52] U.S. Cl. ............................................. 152/209 R
[58] Field of Search ............... 152/209 R, 209 D, 533, 152/531

[56] References Cited

U.S. PATENT DOCUMENTS

| | | | |
|---|---|---|---|
| 2,224,141 | 12/1940 | Clark | 152/209 R |
| 3,364,965 | 1/1968 | Oubridge | 152/209 R |
| 4,152,186 | 5/1979 | Shibata | 156/123 |
| 4,319,620 | 3/1982 | Knill | 152/209 R |
| 4,445,560 | 5/1984 | Musy | 152/209 R |
| 4,580,608 | 4/1986 | Rampl | 152/209 R |

FOREIGN PATENT DOCUMENTS 1445678 6/1966 France ............................ 152/209 R
61-37503 2/1986 Japan .

Primary Examiner—Raymond Hoch
Attorney, Agent, or Firm—Sughrue, Mion, Zinn, Macpeak & Seas

[57] ABSTRACT

A pneumatic radial tire for use in heavy duty vehicles such as an airplane and so on comprises at least one carcass ply as a tire body reinforcement, at least two belt layers as a tread reinforcement, and a tread provided with a pair of main grooves extending circumferentially of the tread at a position ranging from the side end of the tread within 15~40% of tread ground contact width. In this tire, the tread is composed of a tread rubber satisfying a requirement that modulus at 100° C. under 100% elongation of tread rubber constituting each side portion of the tread is lower by a range of 30~80% than that of tread rubber constituting a central portion of the tread.

5 Claims, 2 Drawing Sheets

FIG_1
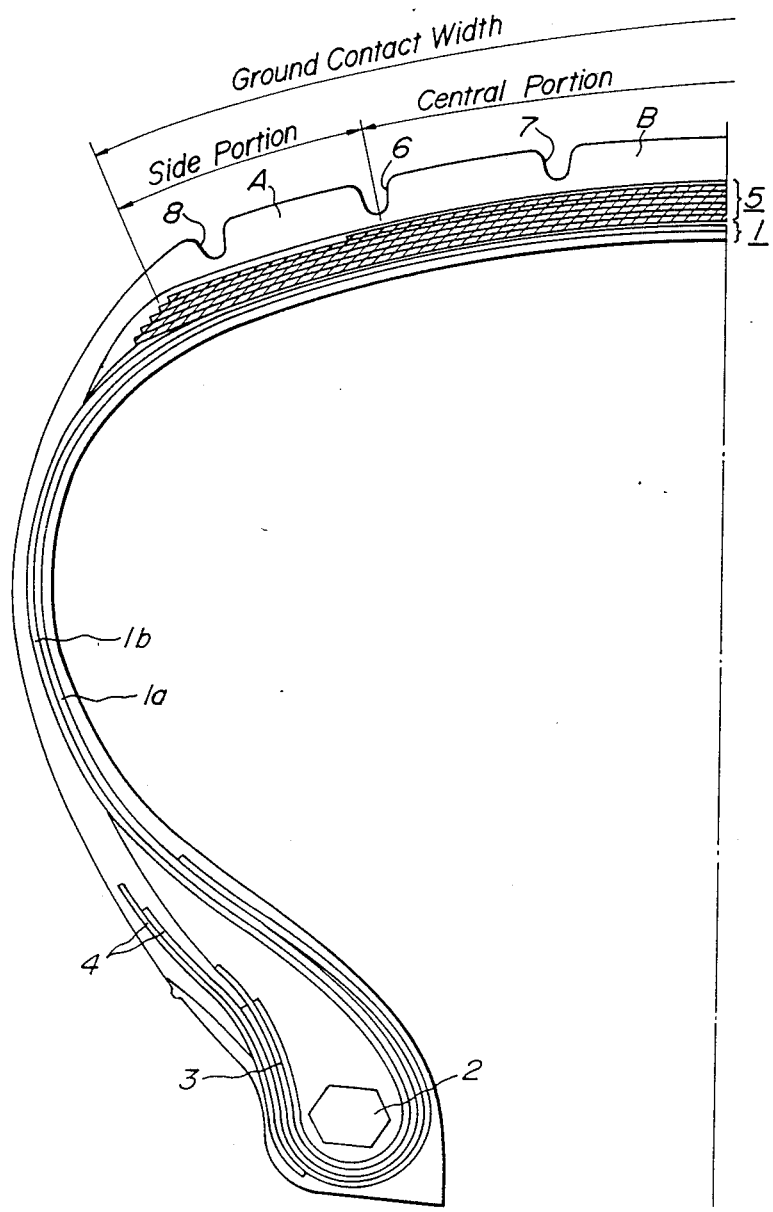

FIG_2a
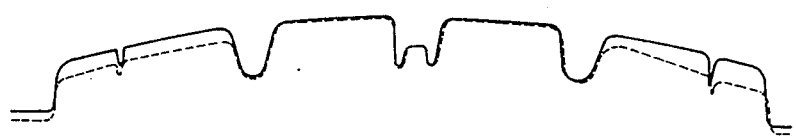
FIG_2b
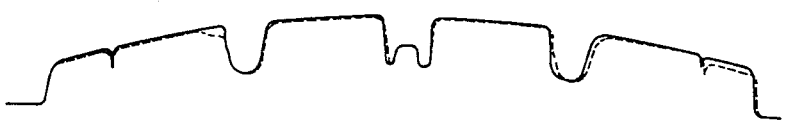
FIG_2c
FIG_2d
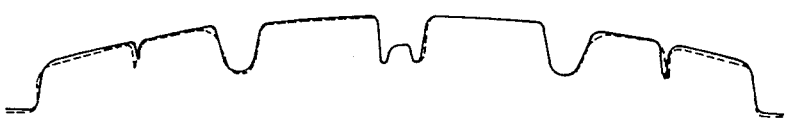

PNEUMATIC RADIAL TIRES

BACKGROUND OF THE INVENTION

1. Field of the Invention

This invention relates to pneumatic radial tires, and more particularly to a pneumatic radial tire usable for heavy duty vehicles, particularly airplanes.

2. Related Art Statement

Since radial tires for use in heavy duty vehicles, particularly airplanes are used under considerably peculiar and special conditions as compared with tires used for passenger cars, trucks, buses and the like, research on such tires has been late in starting and these tires are developing at the present. The structure of this tire is not fixed but is roughly divided into the following two parts:

1. As a carcass of radial structure, one or more plies containing organic fiber cords or metal cords, particularly steel cords are used likewise the case for general-purpose vehicles, while plural belt layers each containing one or few organic fiber cords wound at a slight small spiral angle circumferentially of the tread, cords of which layers being crossed with each other, are laminated and used as a belt.

2. The structure of the above item 1 is basic and further a bias cord layer is added as a belt layer. In any case, the tread pattern, tread rubber and the like are substantially the same as usually used in the conventional bias tires for airplanes.

In Japanese Patent laid open No. 61-37,503 is disclosed the improvement of friction performance on snow and ice road surface by producing a difference of hardness in tread rubber between the central portion of the tread and each side portion thereof, the application of which is restricted to general-purpose tires. However, there is no mention of properties of tread rubber in connection with peculiar service environments for airplane radial tires.

When the heavy duty radial tire is run at higher speed under a high internal pressure, and particularly when the shoulder portion of the tread is a so-called round shape as in the airplane tire, tread wearing is accelerated at both side portions of the tread, particularly in the vicinity of each widthwise ground contact end of the tread as compared with the central portion thereof. Consequently, a so-called uneven wearing phenomenon is apt to be caused.

It has been confirmed that the above uneven wear is considerably accelerated when the belt reinforcing the tread has particularly a reinforcing structure hardly producing the deformation based on the rotation of the tire under loading in the vicinity of both side ends of the belt. An example is folded structure of the belt layer at its both side ends or a lamination structure of plural belt layers each containing the cord wound at a slight small spiral angle circumferentially of the tread.

On the other hand, it is indispensable to avoid the occurrence of a so-called standing wave under high-speed running conditions as typified in airplanes. For this purpose, the reinforcing structure as mentioned above is required for enhancing the circumferential stress of the belt. Therefore, the prevention of standing wave is clearly conflicting with the reduction of the uneven wear.

SUMMARY OF THE INVENTION

It is an object of the invention to provide a pneumatic radial tire which advantageously solves the above conflicting requirements and reduces the uneven wear of the tread without damaging the demand for the belt reinforcement.

According to the invention, there is the provision of a pneumatic radial tire comprising at least one carcass ply as a tire body reinforcement and at least two belt layers as a tread reinforcement, said tread being provided with a pair of main grooves extending circumferentially of the tread and located at a position ranging from the side end of the tread within 15~40% of tread ground contact width, characterized in that said tread is composed of a tread rubber satisfying a requirement that a modulus at 100° C. under 100% elongation of tread rubber constituting each side portion of the tread is lower by a range of 30~80% than that of tread rubber constituting a central portion of the tread sandwiched between said main grooves.

In a preferred embodiment of the invention, the modulus in both the side portions of the tread is lower by a range of 40~70% than that of the central portion. Preferably, the modulus of the central portion is 18~50 kgf/cm$^2$ and the modulus of each side portion is 15~30 kgf/cm$^2$.

In any case, the belt layer reinforcing the tread is composed of one or few organic fiber cords wound at a slight small spiral angle circumferentially of the tread (or a so-called substantially circumferential arrangement).

BRIEF DESCRIPTION OF THE DRAWINGS

The invention will be described with reference to the accompanying drawings, wherein:

FIG. 1 is a radial half-sectional view of an embodiment of the pneumatic tire according to the invention; and FIGS. 2a to 2d are diagrammatic views showing behaviors of uneven wear generated in various tires, respectively.

DESCRIPTION OF THE PREFERRED EMBODIMENTS

In radial tires for use in heavy duty vehicles under high-speed running condition typifying airplane tires, since the shearing rigidity in both side portions of the tread is enhanced by the belt comprised of so-called circumferential cord arrangement, each side portion of the tread, particularly ground contact end (widthwise side end) of the tread is rendered into a so-called round shoulder as compared with the central portion of the tread. Furthermore, the effective rotational radius of the tire in the vicinity of the shoulder is made smaller than the other portion during the running under load. That is, premature wearing frequently occurs in the shoulder due to so-called dragging phenomenon accompanied with the above two facts. Moreover, such wear is accelerated by the degradation of ground contact form in both side portions of the tread resulted from the enhancement of the aforementioned shearing rigidity.

In this connection, if shearing rigidity is reduced, the difference in effective rotational radius between the side portion and the central portion is absorbed by the deformation in running under loading, but the reinforcing effect required in the belt is injured, so that the reduction of the shearing rigidity is not suitable for the purpose of intended use.

Further, it has been considered to arrange rubber having a good wear resistance or rubber having a high hardness in both side portions of the tread, but this means was not so effective in practical use.

Since wear is generally represented by work done by the time, the inventors have noticed to reduce the work done in both side portion of the tread because the side portion is large in the forced deformable element but the deformation thereof is constant and made various studies from a viewpoint of reducing stress with holding the displacement constant, and the invention has been accomplished.

Namely, the fundamental idea of the invention is to prevent the occurrence of uneven wear by making the tread wear accompanied with the running of the tire over the widthwise direction thereof as uniform as possible.

On the other hand, when using the belt layer comprised of the circumferential cord arrangement as in the radial tire for airplane, the reinforcing effect of this belt layer strongly acts to the both side portions of the tread, so that the wear work done in the shoulder portion becomes larger. In this connection, according to the invention, a more flexible rubber is used in the shoulder portion of the tread as compared with rubber for the central portion thereof, whereby the stress is made small in the shoulder portion to reduce the difference in wear work done between the shoulder portion and the central portion and hence uniformize it in the widthwise direction of the tread. This thought is applicable to the other heavy duty tires, for example, radial tires for truck and bus.

In this case, the feature that the boundary between the rubber for the central portion and the rubber for the side portion is exposed on the tread surface is unfavorable from a viewpoint of friction performances. The rubber boundary is located at the bottom of the main groove continuously extending circumferentially of the tread, whereby the occurrence of undesirable stepwised wear due to the contact of the rubber boundary with ground is prevented. Moreover, the main groove is located at a position ranging from the end tread side end within 15~40% of the ground contact width and is arranged so as to sandwich the tread center.

When the position of the main groove is restricted to a range of 15~40% of the ground contact width measured from the tread side end for sufficiently developing different properties expected in tread rubbers bordered at the groove bottom of the main groove, the uniformization of wear work done over the widthwise direction of the tread can be achieved under an adequate difference in rubber property between the central portion and the side portion in the tread as mentioned later.

That is, the difference in rubber property between the central portion and the side portion in the tread is a feature that the modulus at 100° C. under 100% elongation of rubber constituting the side portion of the tread is lower by a range of 40~80% than that of rubber constituting the central portion. When the difference of the modulus is less than 40%, the cut resistance lowers to shorten the service life of the tire. However, when it exceeds 80%, the effect of preventing the uneven wear is not developed. Preferably, the difference in the modulus is within a range of 40~70%. Moreover, the modulus of the central portion is about 18~50 kgf/cm$^2$, and that of the side portion is about 15~30 kgf/cm$^2$.

Such a modulus should be measured at 100° C. because uneven wear occurs during the running under loading and each portion of the tire is at a high temperature due to heat build-up.

The invention will be described with reference to the following example.

EXAMPLE

In FIG. 1 is sectionally shown an embodiment of the airplane tire (tire size: H46×18R20) to be applied to the invention, wherein numeral 1 is a carcass composed of at least one ply, particularly two plies 1a, 1b in the illustrated embodiment, numeral 2 a bead core, numeral 3 a turnup portion of the carcass 1 wound around the bead core 2 from the inside of the tire toward the outside thereof, numeral 4 a chafer, and numeral 5 a belt composed of at least two belt layers, particularly five main belt layers and an additional narrow belt layer in the illustrated embodiment.

In this case, aromatic polyamide fiber cords (Kevlar cord, trade name) are used as a cord for the carcass ply, while the Kevlar cord is also used as a cord in each belt layer for the belt 5 in a so-called circumferential arrangement.

Symbol A of FIG. 1 is a tread rubber in each side portion of the tread, and symbol B is a tread rubber in a central portion of the tread. The boundary between the tread rubber A and the tread rubber B is located at a groove bottom of a main groove 6 formed in the tread at a position corresponding to 29% of a ground contact width of the tread from the tread side end. Moreover, numerals 7 and 8 are circumferential grooves forming a desired tread pattern together with the main groove 6.

When using a combination of the tread rubbers A and B by variously changing the modulus at 100° C. under 100% elongation of these rubbers, the wear difference between the tread center and the shoulder is measured after the tire subjected to an internal pressure of 15.5 kgf/cm$^2$ was run at a speed of 40 miles/hr under a loading of 20.050 kg over a distance of 1,500 km and compared with respect to an average value of wear over the whole periphery of the tread to obtain results as follows:

|  | Control | Example | Comparative Example 1 | Comparative Example 2 |
|---|---|---|---|---|
| Modulus of rubber A (kgf/cm$^2$) | 27.0 | 21.0 | 40.0 | 14 |
| Modulus of rubber B (kgf/cm$^2$) | 27.0 | 40.0 | 21.0 | 56 |
| A/B × 100 (%) | 100 | 52.5 | 190.5 | 25 |
| Wear difference (mm) | 4 | 0.5 | 10 | 0.8 |

As seen from the above, the remarkable mitigation of uneven wear in the example according to the invention is achieved as compared with the worn amount of the control. On the contrary, uneven wear considerably increases in Comparative Example 1 wherein the combination of the rubbers A and B is quite opposite to the case of the example according to the invention. Moreover, in Comparative Example 2 wherein the difference in modulus between the rubbers A and B is lower than the lower limit defined by the invention, the mitigation of uneven wear is remarkable, but the cut resistance considerably degrades, so that the tire of Comparative Example 2 is small in the practical value.

The behavior of tread wear in these tires is shown in FIGS. 2a to 2d by piling a sectional profile of the tread after the running (dotted lines) on a sectional profile of the tread before the running (solid line), wherein FIG. 2a show the wearing behavior in the control, FIG. 2b shows the wearing behavior in the example according to the invention, and FIGS. 2c and 2d show the wearing behaviors in Comparative Examples 1 and 2, respectively.

As mentioned above, according to the invention, uneven wear frequently generated in the vicinity of shoulder portions of the tread can effectively be mitigated under the enhancement of the shearing rigidity of the belt reinforcing the tread, so that the service life of radial tires for heavy duty vehicles typifying an airplane can considerably be prolonged.

What is claimed is:

1. A pneumatic radial tire comprising: at least one carcass ply as a tire body reinforcement and at least two belt layers as a tread reinforcement, said tread being provided with a pair of main grooves extending circumferentially of the tread a central tread portion between said main grooves and side portions of said tread laterally outside each of said main grooves, each of said main grooves being located at a position from the nearest side end of the tread within a range of 15–40% of the total tread ground contact width; and each of said tread side portions is composed of a tread rubber satisfying a requirement that a modulus at 100° C. under 100% elongation of tread rubber that is lower by a range of 30–80% than that of tread rubber constituting said central tread portion of the tread between said main grooves.

2. The pneumatic radial tire according to claim 1, wherein a boundary between said tread rubber constituting each of said side portions and said tread rubber constituting said central portion is located at a groove bottom of each of said main grooves.

3. The pneumatic radial tire according to claim 1, wherein said modulus of said tread rubber in said side portions is lower by a range of 40–70% than that in said central portion.

4. The pneumatic radial tire according to claim 1, wherein said modulus of said tread rubber in said central portion is 18–50 kgf/cm$^2$ and said modulus of said tread rubber in said side portions is 15–30 kgf/cm$^2$.

5. The pneumatic radial tire according to claim 1, wherein said belt layers are comprised of one or few organic fiber cords wound at a slight small spiral angle circumferentially of said tread.

* * * * *